US006698335B1

United States Patent
Bourgeois

(10) Patent No.: US 6,698,335 B1
(45) Date of Patent: Mar. 2, 2004

(54) GAS FIRED OUTDOOR COOKING APPARATUS

(76) Inventor: Norman R. Bourgeois, 712 Saint George Ave., Jefferson, LA (US) 70121

( * ) Notice: Subject to any disclaimer, the term of this patent is extended or adjusted under 35 U.S.C. 154(b) by 0 days.

(21) Appl. No.: 10/229,313

(22) Filed: Aug. 27, 2002

Related U.S. Application Data

(63) Continuation-in-part of application No. 09/838,091, filed on Apr. 19, 2001, now Pat. No. 6,439,107, which is a continuation-in-part of application No. 09/703,993, filed on Nov. 1, 2000, now abandoned, which is a continuation-in-part of application No. 09/567,676, filed on May 9, 2000, now abandoned, which is a continuation-in-part of application No. 09/426,210, filed on Oct. 25, 1999, now Pat. No. 6,058,830, which is a continuation-in-part of application No. 09/149,842, filed on Sep. 8, 1998, now Pat. No. 5,970,852, which is a continuation of application No. 08/813,463, filed on Mar. 10, 1997, now Pat. No. 5,813,321.

(51) Int. Cl.[7] .......................... A47J 37/00; A47J 37/04; A47J 43/18
(52) U.S. Cl. .......................... 99/340; 99/413; 99/419; 99/426; 99/450; 99/482; 126/30; 126/40
(58) Field of Search .................. 99/339, 340, 345–347, 99/426, 403, 418, 481, 482, 419–421 V, 444–450; 126/25 R, 41 R, 40, 30, 9 R; 426/523

(56) References Cited

U.S. PATENT DOCUMENTS

| 3,053,169 A | | 9/1962 | Rappaport |
|---|---|---|---|
| 3,583,307 A | | 6/1971 | Lee, Sr. |
| 4,162,650 A | * | 7/1979 | Davis et al. ................. 99/419 |
| 4,420,493 A | | 12/1983 | Greck et al. |
| 4,450,759 A | | 5/1984 | Steibel |
| 4,735,135 A | | 4/1988 | Walker |
| 4,945,824 A | | 8/1990 | Borgmann |
| 5,065,735 A | | 11/1991 | Bourgeois et al. |
| 5,106,642 A | | 4/1992 | Ciofalo |
| 5,301,602 A | | 4/1994 | Ryczek |

(List continued on next page.)

FOREIGN PATENT DOCUMENTS

| AT | 2685862 | 7/1993 |
|---|---|---|
| DE | 217592 | 10/1961 |
| GB | 2205734 A | 12/1988 |

OTHER PUBLICATIONS

King Kooker® Jan. 1, 1996 Brochure, Metal Fusion, Inc.
King Kooker® Jan. 1, 1997 Brochure, Metal Fusion, Inc.
King Kooker® Jan. 1, 1998 Brochure, Metal Fusion, Inc.
King Kooker® Jan. 1, 1999 Brochure, Metal Fusion, Inc.
King Kooker® Jan. 1, 2000 Brochure, Metal Fusion, Inc.
U.S. patent application No. 09/703,993 for "Gas Fired Outdoor Cooking Apparatus," Filed Nov. 1, 2000.

*Primary Examiner*—Timothy F. Simone
(74) *Attorney, Agent, or Firm*—Garvey, Smith, Nehrbass & Doody, L.L.C.; Charles C. Garvey, Jr.

(57) ABSTRACT

A cooking apparatus enables a user to cook bu boiling, steaming or frying food items. The apparatus includes a burner having a base that is specially shaped to cradle a pot. The pot has a valved flowline that enables the user to drain any fluid that was used for cooking (eg. water, oil, seasoned water, stock, etc.). An upper section above the support surface of the burner for engaging the sidewall of the pot should the pot be tipped inadvertently. The burner includes upper members that are supported above the bottom of the pot and a lower member that engages an underlying supporting surface. The upper pot support members include a ring with a bent, U-shaped section that extends on opposite sides of and under the valved drain flowline. The burner frame can have a plurality of circumferentially spaced radially extending legs. Radial and circumferentially spaced struts define part of the frame and are shaped and cradle the bottom of the pot and its sidewall respectively.

40 Claims, 16 Drawing Sheets

U.S. PATENT DOCUMENTS

| | | |
|---|---|---|
| 5,431,092 A | 7/1995 | Guillory |
| 5,442,999 A | 8/1995 | Meister |
| 5,531,154 A | 7/1996 | Perez, III |
| 5,575,198 A | 11/1996 | Lowery |
| 5,586,489 A | 12/1996 | Fraga |
| 5,662,028 A | 9/1997 | Fraga |
| 5,665,258 A | 9/1997 | Hsu |
| 5,673,611 A | 10/1997 | Tieman |
| 5,758,569 A | 6/1998 | Barbour |
| 5,813,321 A | 9/1998 | Bourgeois |
| 5,896,810 A | 4/1999 | Barbour |
| 5,970,852 A | 10/1999 | Bourgeois |
| 6,058,830 A | 5/2000 | Bourgeois |
| 6,314,869 B1 * | 11/2001 | Bourgeios, Jr. .............. 99/340 |
| 6,439,107 B1 | 8/2002 | Bourgeois |

* cited by examiner

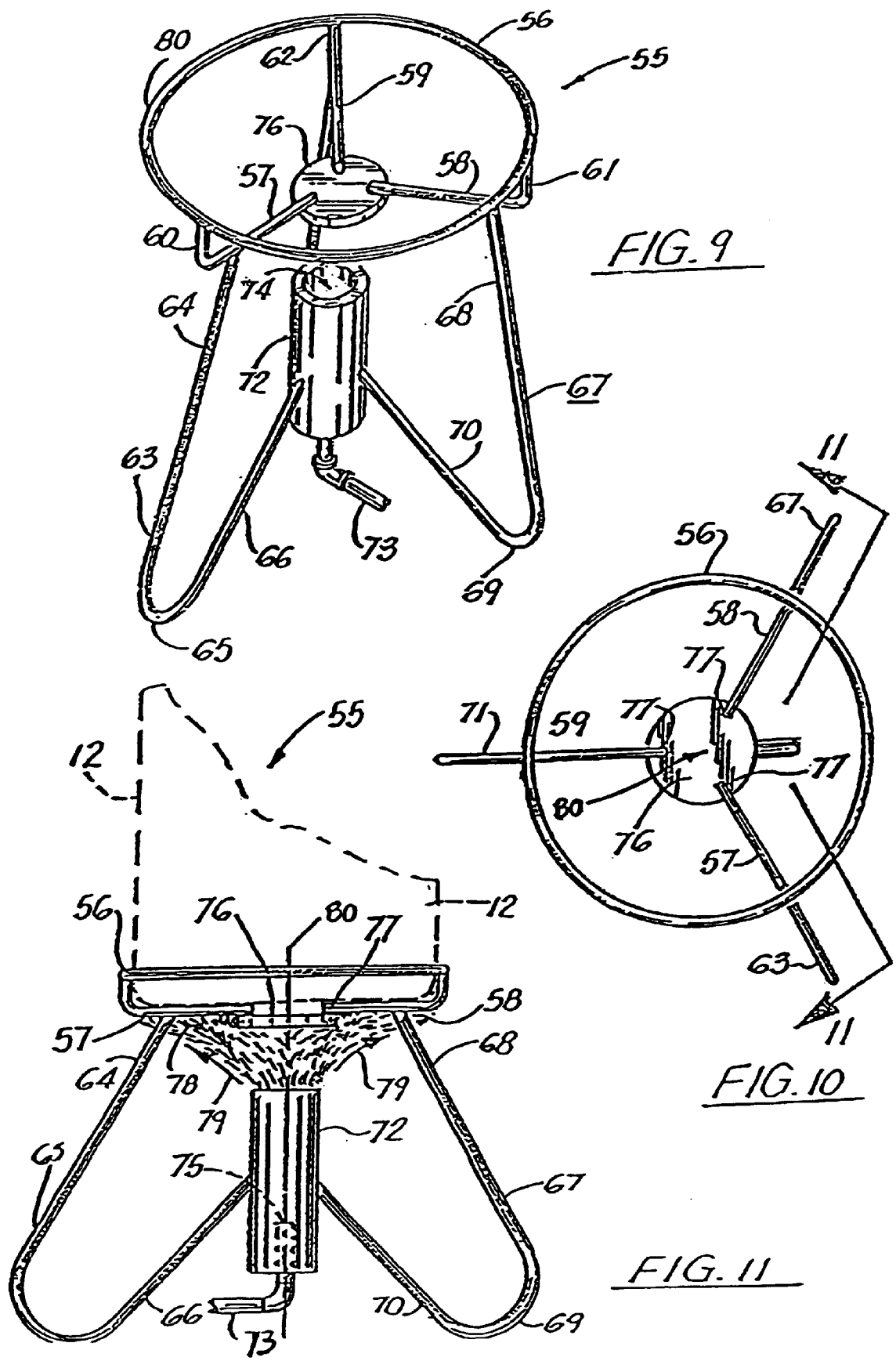

GAS FIRED OUTDOOR COOKING APPARATUS

CROSS-REFERENCE TO RELATED APPLICATIONS

This is a continuation-in-part of U.S. Ser. No. 09/838,091, filed Apr. 19, 2001 (now U.S. Pat. No. 6,439,107), which is a continuation-in-part of U.S. Ser. No. 09/703,993, filed Nov. 1, 2000 now abandoned which is a continuation in part of U.S. Ser. No. 09/567,676, filed May 9, 2000 (now abandoned) which is a continuation in part of U.S. patent application Ser. No. 09/426,210, filed Oct. 25, 1999 (now U.S. Pat. No. 6,058,830), which is a continuation in part of U.S. patent application Ser. No. 09/149,842, filed Sep. 8, 1998 (now U.S. Pat. No. 5,970,852), which is a continuation of U.S. Ser. No. 08/813,46 filed Mar. 10, 1997 (now U.S. Pat. No. 5,813,321).

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices and cooking accessories and more particularly to a natural gas fired outdoor cooker that is supplied with a source of fuel such as butane or propane from a canister and that includes a stand, pot, and pot liner, the improvement including a special configuration of the burner and a connected table that enables a user to quickly support a pot liner or basket upon the table after it is removed from the pot of boiling liquid.

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the Jan. 1, 1996 brochure of Metal Fusion, Inc., of Jefferson, Louisiana. Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include the aforemeniomed U.S. Pat. Nos. 5,813,321; 5,970,852; and 6,058,830.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are appertured longitudinally for receiving a knife to cut food within the tube member.

Issued patents to Barbour (U.S. Pat. Nos. 5,758,569 and 5,896,810) disclose a cooking apparatus directed to the frying of poultry items such as turkeys.

Several patents have issued that are directed to a cooker or pot having a spigot provided on the pot wall that enables liquid to be withdrawn from the pot via the spigot. An example of such an early patent is the Saroni patent 57,577 entitled "Apparatus for Steaming Vegetables." In the Saroni 577 patent, a spigot B is provided for withdrawing liquid from the receptacle or pot.

The Paterson patent 74,123 discloses in FIG. 1 a spigot mounted on the wall of a pot.

The Durham patent 123,876 discloses a boiler (see FIGS. 1 and 3) in the form of a pot having handles and a lid H. The Durham '876 patent states that one or more of the lower components are using for cooking solids, and the others are either for soup or other liquid, the latter C or either of them being provided with a tap D at the bottom for drawing off the contents.

The Goodwyn patent provides a cooking vessel. A faucet B is provided at the lower end of the boiler A.

The Harper U.S. Pat. No. 1,054,114 discloses a furnace that includes a vat that can be fastened to the top of the fire box by means of a sleeve D formed integral therewith and adapted to fit over the smoke pipe E. This vat is provided with a cover D' and also an outlet pipe E having a spigot E'

A cooking vessel is disclosed in the Clayton U.S. Pat. No. 1,272,222 that includes a cooking vessel 10 having an outlet nipple 11 in which is rotatably mounted on a valve plug 12. This valve structure enables the liquid to be easily drawn off.

The Jobe U.S. Pat. No. 1,390,908 discloses a cooking vessel that has an outer pipe 20 that has one end communicating with the inner receptacle for drawing liquids therefrom, the pipe extending through the outer receptacle and equipped with a valve 21.

The Austin U.S. Pat. No. 1,827,131 provides a pot drain in the form of pipe 12 that is fitted with a cap 13.

The Baker U.S. Pat. No. 2,350,335 discloses a brewer or cooker that has a drain valve 7 adjacent its lower end through which brewed coffee may be withdrawn.

The Shipman U.S. Pat. No. 3,838,680 discloses a combination heating and serving assembly having a drainage outlet or spigot 32 by which the liquid contents of the container may be drawn off from time to time.

One of the problems with outdoor cookers is the handling of very large pots that contain a high volume of cooking fluid such as vegetable oil. It is desirable that such an outdoor cooking apparatus have good stability to support the very heavy and often tall pot during cooking, and during placement of or removal of the pot, liner or both from the burner. Further, the cooking fluid is desirably reused for certain cooking fluids such as vegetable oils. One solution is to drain the pot, yet also provide for drainage without removal from the burner. However, the burner must enable such drainage and still provide a safe, stable cooking platform for very large capacity cooking pots.

BRIEF SUMMARY OF THE INVENTION

The present invention includes a burner frame having a base for engaging an underlying support surface, the burner having a nozzle for generating a high intensity flame for use in cooking, and a supply hose for supplying propane to the burner. The burner frame has a support surface for cradling a pot.

A pot is provided that includes a flat bottom portion and cylindrically-shaped continuous side walls, the pot having a generally cylindrically-shaped interior for receiving a basket. The basket or liner removably fits the pot interior. The basket can include a base that registers against the bottom of the pot and a vertically extending portion adjacent to the pot wall that connects to a bail.

The burner frame includes a ring that is supported above the bottom of the pot on the exterior of the pot for engaging the sidewall of the pot should the pot be tipped.

The upper ring is supported by a plurality of generally "L" shaped struts that extend from the upper ring downwardly along a generally vertical path and then horizontally to cradle the bottom of the pot.

The upper ring is specially configured as will be described more fully hereinafter to enable drainage of the pot and without removal from the burner.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a perspective view of the preferred embodiment of the apparatus of the present invention showing an alternate burner construction;

FIG. 10 is a top view of the burner of FIG. 9;

FIG. 11 is a sectional view taken along lines 11—11 of FIG. 10;

DETAILED DESCRIPTION OF THE INVENTION

Figure 1:
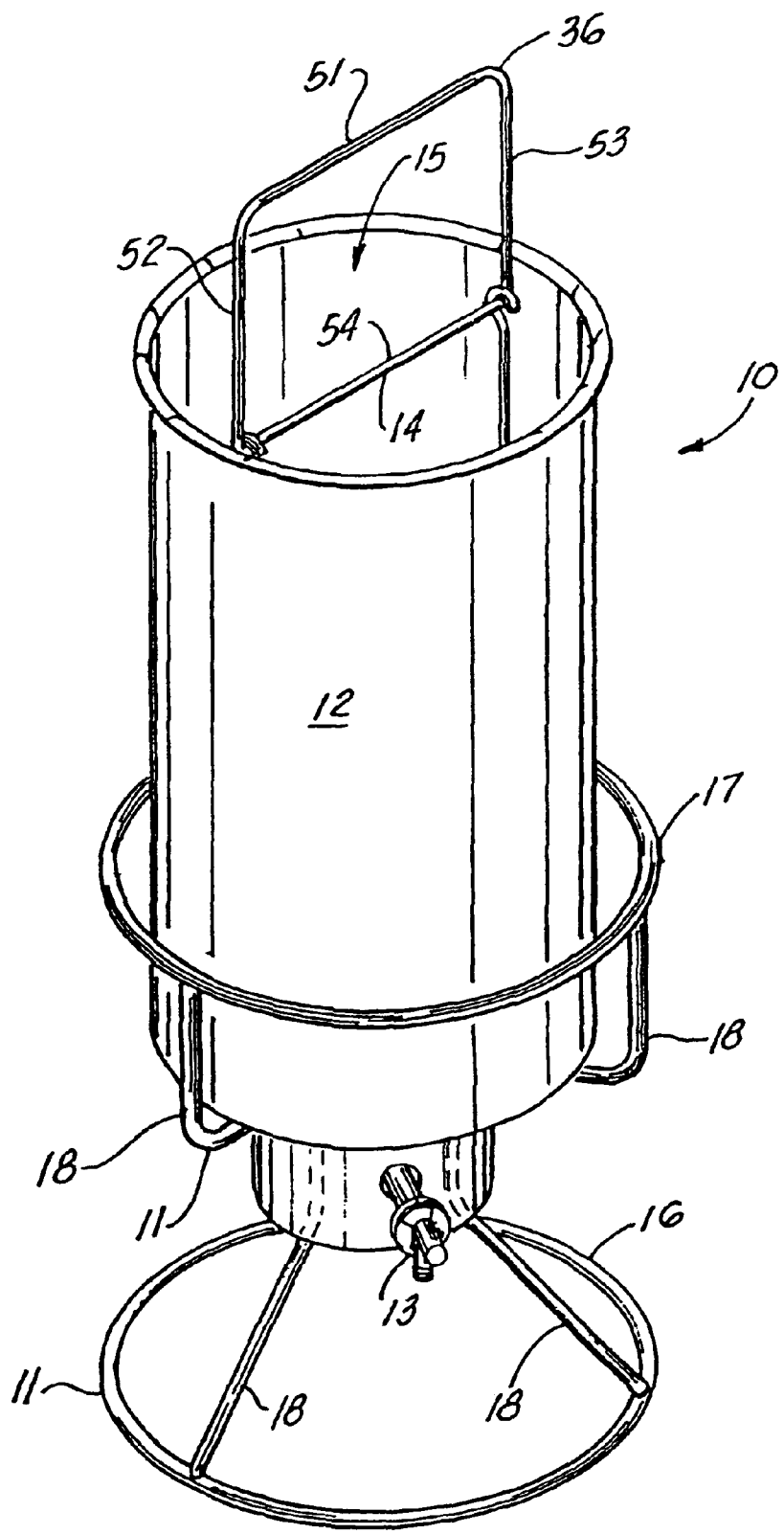
FIG. 1 is a perspective view of the preferred embodiment of the apparatus of the present invention.

The present invention provides an outdoor cooking apparatus designated generally by the numeral 10 in FIG. 1. The apparatus 10 includes a burner 11, pot 12, supply valve 13, a commercially available flexible hose for supplying propane or like fuel for firing the burner 11, and a basket 14 (see FIGS. 2–3) that can be lowered into the interior 15 of pot 12. In FIGS. 4–8, burner 11 includes a lower ring 16 and an upper ring 17. Burner 11 has a nozzle or jet surrounded by cylindrically-shaped wind guard 22.

The rings 16, 17 are connected with a plurality of struts 18. Each strut 18 includes radially extending, inclined lower strut section 19, upper strut section 20, and vertical center strut section 21. Each of the lower strut sections 19 is linear in shape, and inclined to form a connection between the lower or base ring 16 and the bottom of central strut section 21 (see FIG. 6).

Upper strut sections 20 are generally "ell" shaped having a lower end portion 23 that forms a connection with the upper end of central strut section 21 and an upper end 24 that forms a connection with upper ring 17.

The "ell" shaped upper strut sections 20 include upper linear section 24, lower linear section 23, and bend sections 25, 26. This configuration provides both a base for holding the bottom surface 27 of pot 12 and a vertically extending portion that envelopes the lower end of pot sidewall 28.

In a preferred embodiment, the ring 17 can be positioned, for example, about 2–8 inches above the bottom surface 27 of pot 12. Further, the upper ring 17 has an inside diameter indicated as 29 in FIG. 7 that closely approaches the outside diameter 30 of pot 12. A clearance of about ½–1½ inches is provided in between the inside of ring 17 and the outside of pot wall 28 during use.

Figure 2:
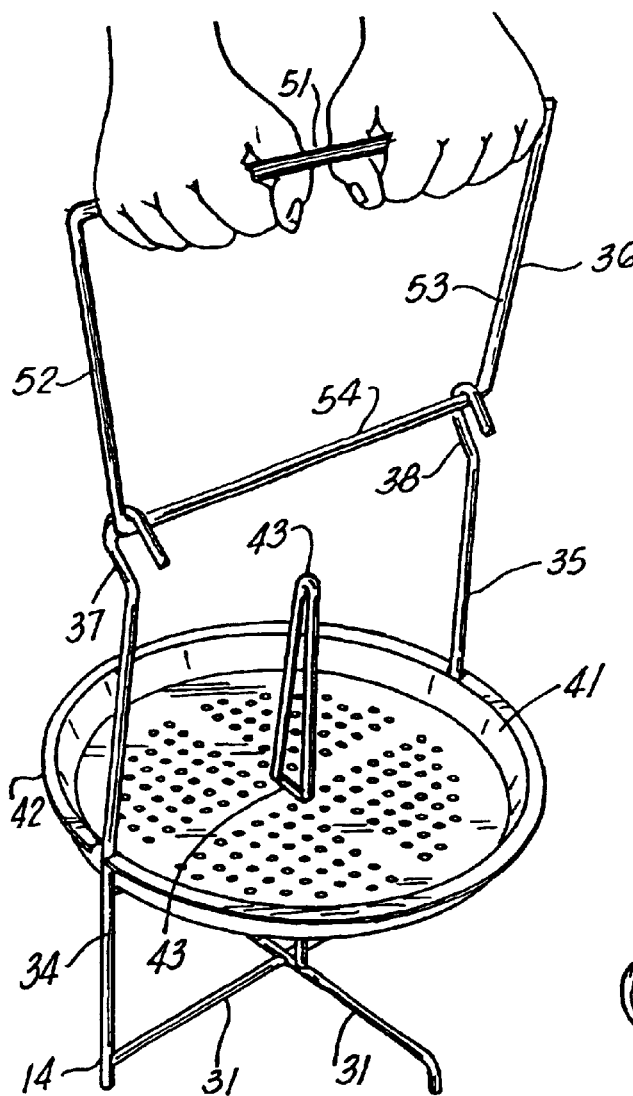
FIG. 2 is a partial perspective view of the preferred embodiment of the apparatus of the present invention illustrating the basket, steam plate, and bail.
Figure 3:
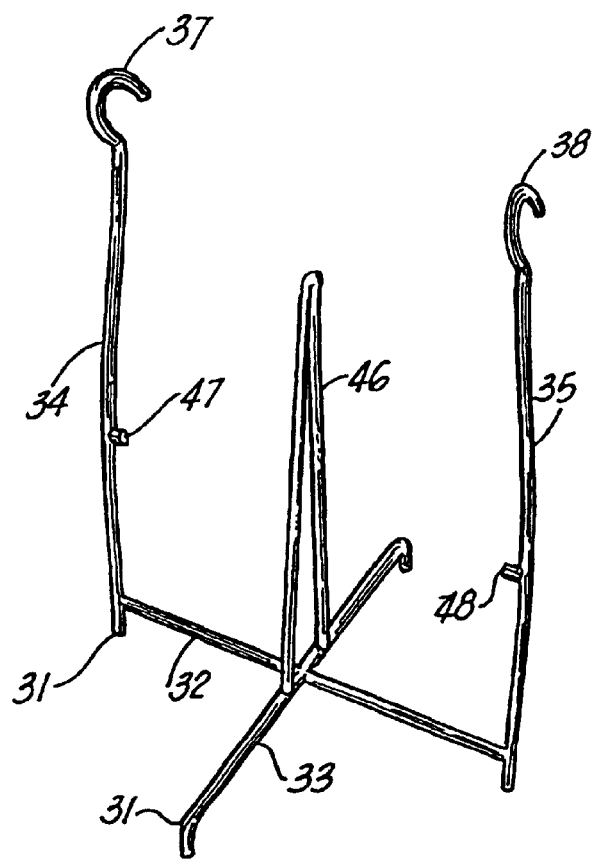
FIG. 3 is a partial perspective of the preferred embodiment of the apparatus of the present invention illustrating the basket portion thereof.
Figure 4:
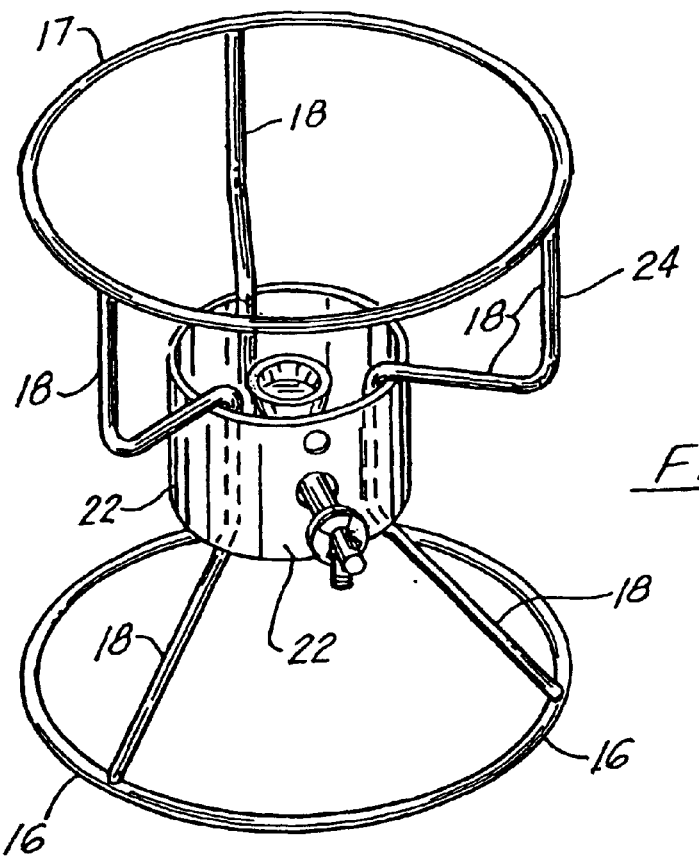
FIG. 4 is a fragmentary perspective view of the preferred embodiment of the apparatus of the present invention illustrating the burner portion thereof.
Figure 5:
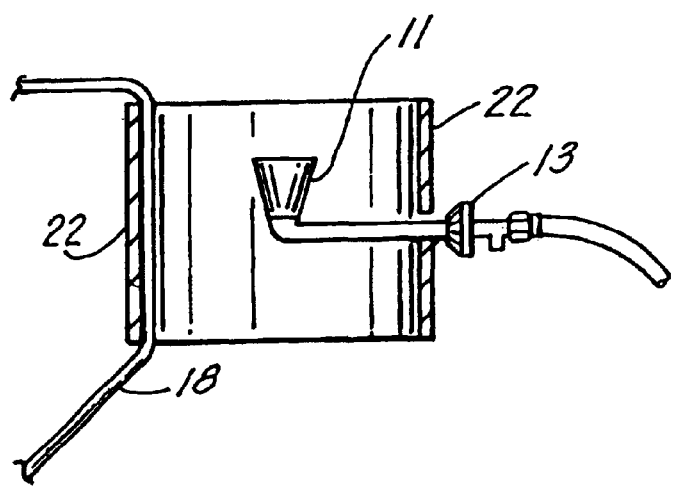
FIG. 5 is a fragmentary sectional elevation view of the burner of FIG. 4.
Figure 6:
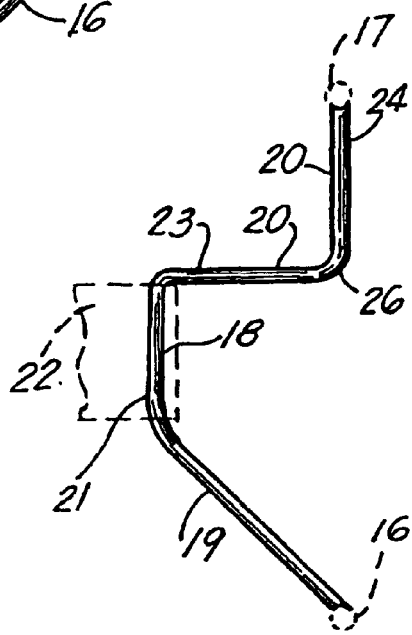
FIG. 6 is a fragmentary sectional elevation view of the burner of FIG. 4.

In FIGS. 1–3, basket 14 includes a wire basket frame base 31 that can be, for example, in the form of a plurality of connected (e.g., welded) wire members arranged in a cross (see FIG. 3).

In FIGS. 2–3, basket 14 includes a base comprised of a pair of linear intersecting members 32, 33, a pair of vertical members 34, 35 and a bail 36. The base can have feet for spacing it from the bottom 27 surface of pot 12.

Each vertical member 34, 35 has a hook 37, 38 respectively for connecting to the lower ends 39, 40 of bail 36, as shown in FIG. 2. Bail 36 can be trapezoidal in shape, having handle portion 51, sides 52, 53 and cross beam 54.

The enlarged handle 51 enables a user to grip with both hands.

Steamer plate 41 can optionally be placed upon basket 14 if food items are to be steamed. Plate 41 has a generally circular shape, providing peripheral edge 42 and central opening 43. Plate 41 is preferably perforated providing an array of openings therethrough that enable steam to access all surfaces of a food item that is placed on the upper surface 45 of plate 41. Drippings from food items can flow through the openings as well.

Figure 7:
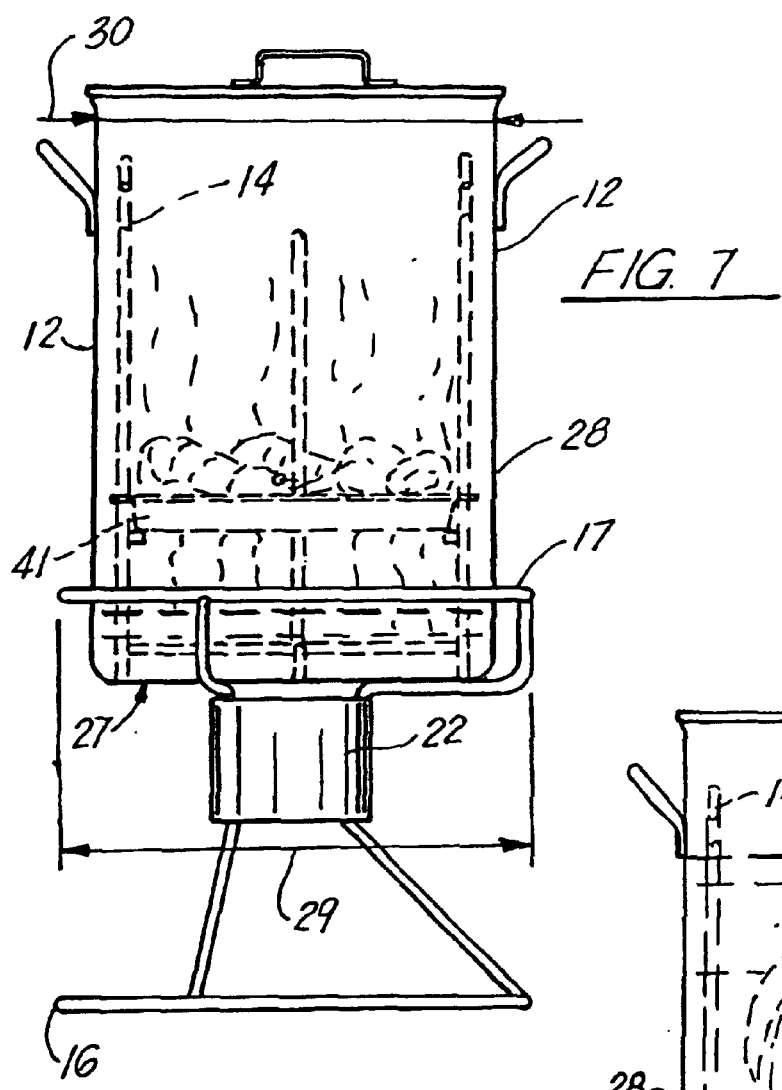
FIG. 7 is a sectional elevation view of the preferred embodiment of the apparatus of the present invention illustrating the burner, pot, and basket portions thereof during steaming.
Figure 8:
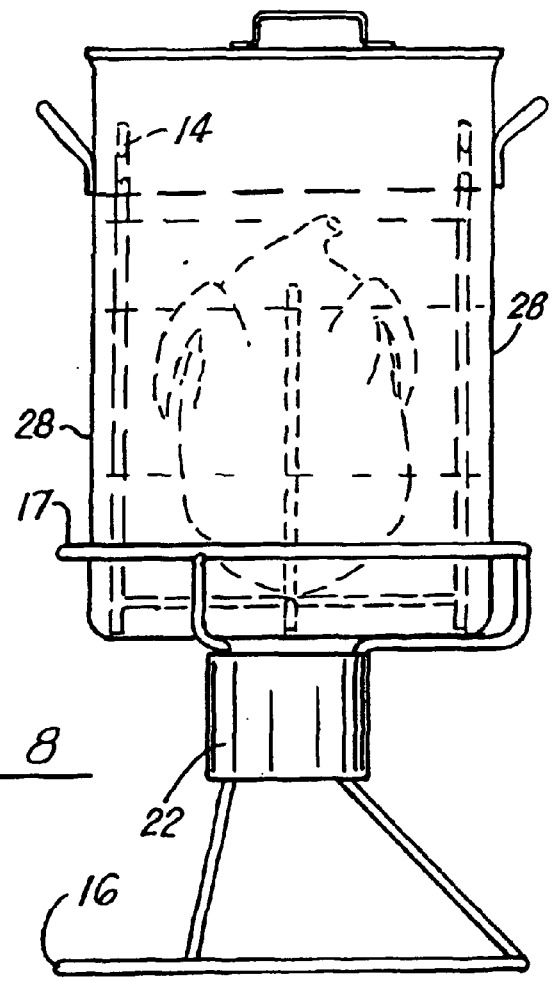
FIG. 8 is a sectional elevation view of the preferred embodiment of the apparatus of the present invention illustrating the burner, pot, and basket portions thereof during boiling.

Support 46 extends upwardly from base 31 of basket 14. Support 46 has a dual function of holding steamer plate 41 as shown in FIGS. 2 and 7 and of supporting a food item such as chicken, turkey or other selected item as shown in FIG. 8.

A pair of laterally extending posts 47, 48 support the peripheral edge 42 of steamer plate 41 when the steamer plate is assembled to the basket 14. Central opening 43 of steamer plate 41 rests upon support 46 when the steamer plate is put in an operational position. The steamer plate is thus supported at its periphery with posts 47, 48 and at its center with support 46. Steamer plate 41 has peripheral slots at 49, 50 that fit vertical members 34, 35 respectively.

The apparatus of the present invention thus provides a dual function cooking apparatus that enables a user to either steam food products such as crabs, lobsters, clams and the like, or boil food items such as fish, shellfish, or poultry items.

Figure 12:
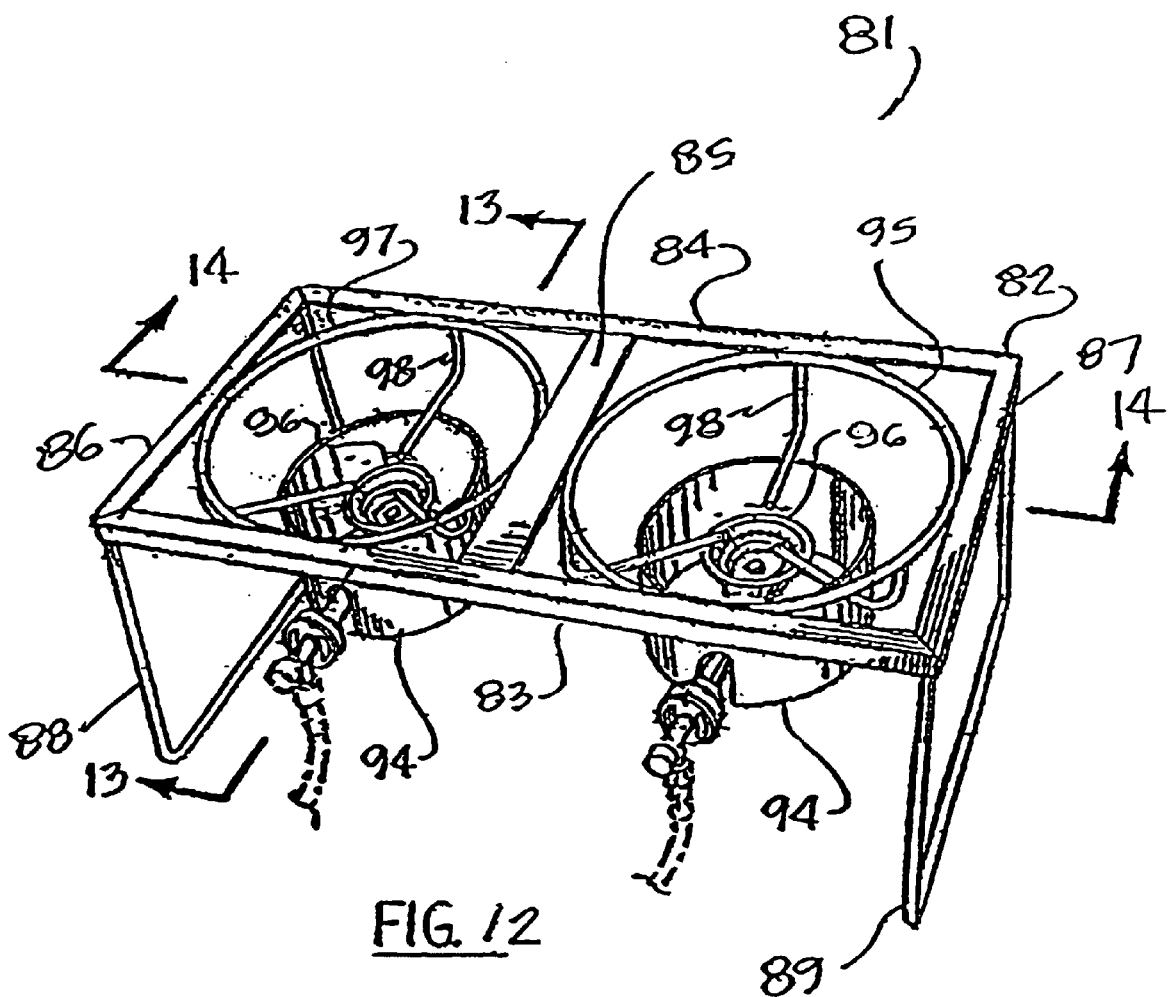
FIG. 12 is a perspective view of an alternate embodiment of the apparatus of the present invention.
Figure 17:
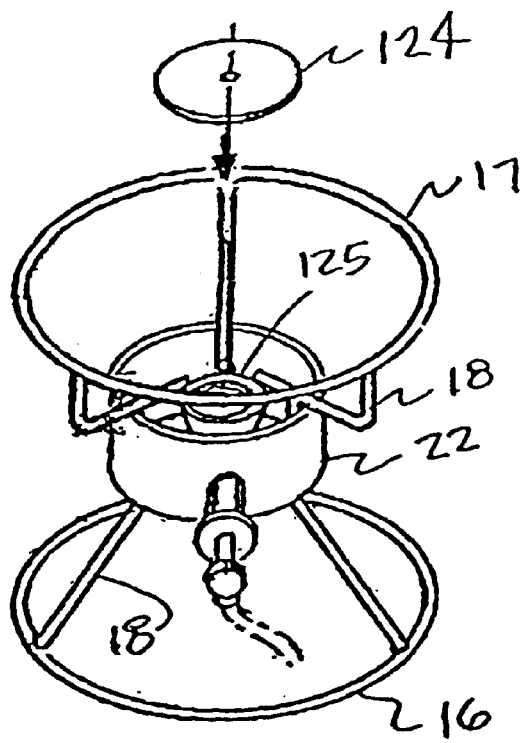
FIG. 17 is a partial perspective view of the third embodiment of the apparatus of the present invention.
Figure 18:
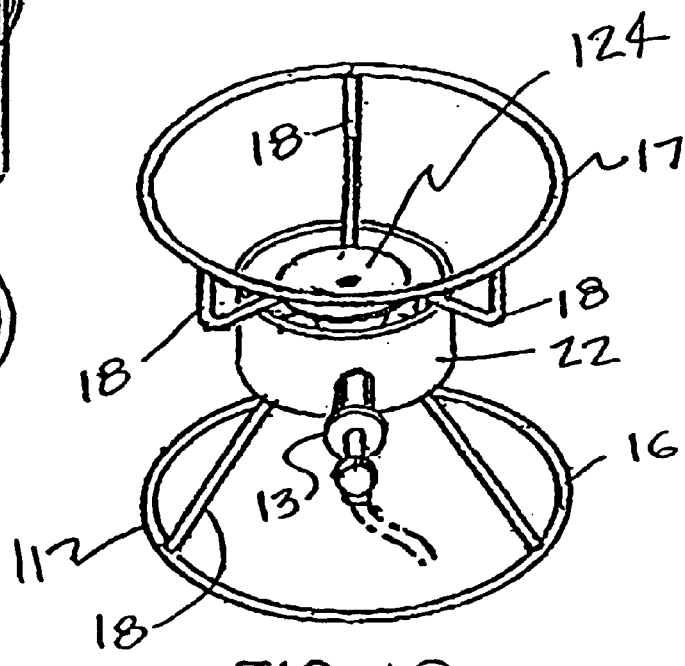
FIG. 18 is another partial perspective view of the preferred embodiment of the apparatus of the present invention.

FIGS. 9–11 show an alternate embodiment of the apparatus of the present invention designated generally by the numeral 55 in FIGS. 12 and 17–18.

Outdoor cooking apparatus 55 includes a burner for supporting pot 12. Burner 55 (FIGS. 9–11) includes upper ring 56 and a plurality of horizontal struts 57–59.

Vertical struts 60–62 are connected integrally to horizontal struts 57–59 respectively. As shown in FIGS. 9–11, a plurality of legs 63, 67, 71 are attached to horizontal struts 57, 5B, 59 respectively. Each leg 63, 67, 71 is formed of a pair of straight sections and a bend section. The leg 63 includes straight sections 64 and 66 connected by bend 65. The leg 67 includes straight sections 68, 70 connected by bend 69. The leg 71 is similarly configured to legs 63 and 67.

A cylindrical flue 72 is placed at the vertical central axis 91 of burner 55 as shown in FIGS. 10 and 11.

The cylindrical flue 72 attaches to each of the legs 63, 67, 71 by welding for example. Each leg 63, 67, 71 attaches to a horizontal strut 57, 58, 62, preferably by welding. Each of the vertical struts 60, 61, 62 attaches to upper end 56 by welding, for example. A fuel supply line 73 is used to supply combustible gas such as propane or butane to nozzle 75. The nozzle 75 is preferably attached to the vertical bore 74 of cylindrical flue 72 by welding or like means known in the art.

Circular plate 76 is attached to the inner end portions of horizontal struts 57, 58, 59 as shown in FIGS. 9–11. This attachment of plate 76 to horizontal struts 57, 58, 59 can be by welding at welds 77 for example.

In FIG. 11, the apparatus 55 of the present invention is shown in operating position wherein pot 12 occupies a position on top of the horizontal struts 57, 58, 59. A flame 78 extends upwardly from nozzle 75. The nozzle 75 can be ignited when propane, butane or like gas is transmitted to the nozzle 75 via pipe line 73 using a match, or like starter. Flame 78 strikes the bottom of plate 76 diverting flame 78 laterally to provide even distribution of heat to the bottom of pot 12. This distribution of the flame 78 outwardly and laterally away from plate 76 is indicated schematically by arrows 79 in FIG. 11.

Figure 13:
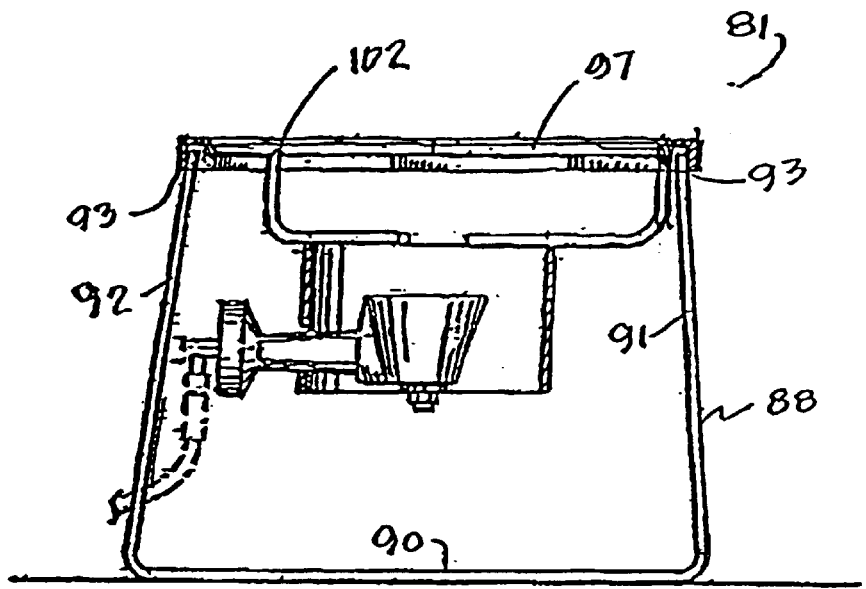
FIG. 13 is a sectional view taken along lines 13—13 of FIG. 12.
Figure 14:
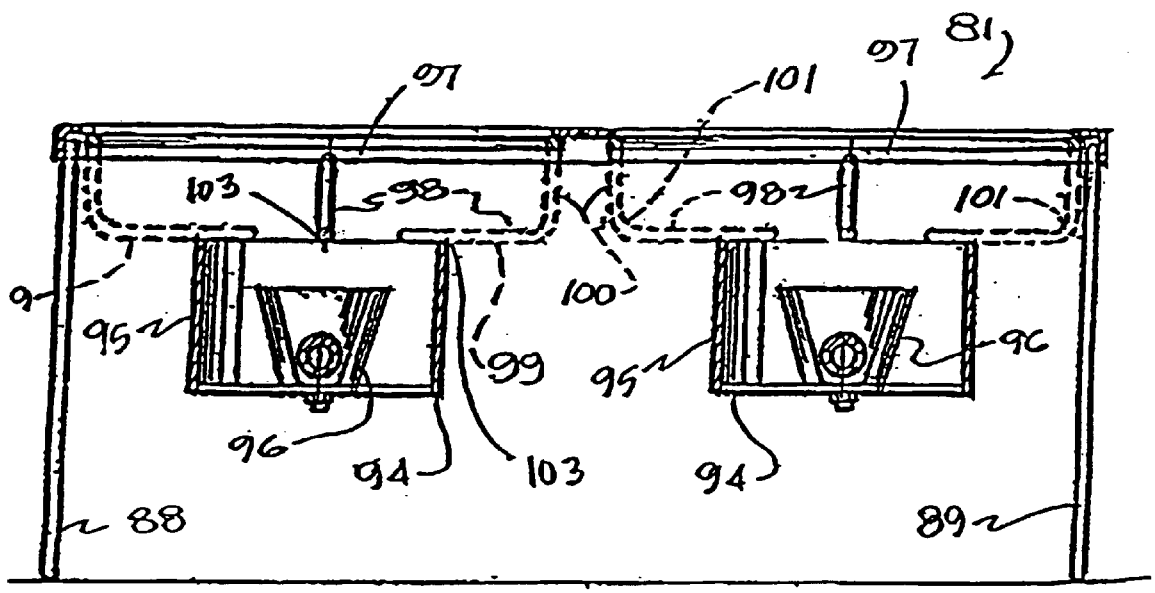
FIG. 14 is a sectional view taken along lines 14—14 of FIG. 12.

FIGS. 12–14 show an alternate embodiment of the apparatus of the present invention designated generally by the numeral 81 in FIGS. 12–14. Burner apparatus 81 includes a frame 82 comprised of a plurality of beams. Frame 82 can be of welded steel construction, for example. Frame 82 thus includes beams 83, 84 that are parallel to each other and central beam 85 that is generally perpendicular to the beams 83, 84.

At the extreme end portions of frame 82, beams 86, 87 extend between respective end portions of beams 83, 84 as shown in FIG. 12. Each of these end beams 86, 87 is connected to a leg 88 or 89. As shown in FIG. 13, attachments 93 (for example, welded attachments) form a connection between each leg 88, 89 and frame 82 at beams 86, 87 respectively.

In FIGS. 13 and 14, each leg 88, 89 is comprised of a horizontal member 90 and a pair of inclined members 91, 92.

In the embodiment of FIGS. 12–14, a pair of burners 94 are provided, each comprising a cylindrically shaped shroud 95, a contained burner element 96 positioned within the shroud 95 as shown in FIGS. 13 and 14 and grate members 98 that support shroud 95 and its contained burner element 96. A ring 97 forms an interface between frame 82 and the plurality of grate members 98. Rings 97 can be welded to the beams at the top of frame 82. In FIG. 12, ring 97 on the left hand side of FIG. 12 is welded to beams 83, 84, 85 and 86. The ring 95 on the right hand side of FIG. 12 is welded to beams 83, 84, 85, and 87. Grate members 98 are welded to ring 97 at attachments 102. Grate members 98 are also connected at attachments 103 to shroud 95. The attachments 103 can be welded connections, for example.

Figure 15:
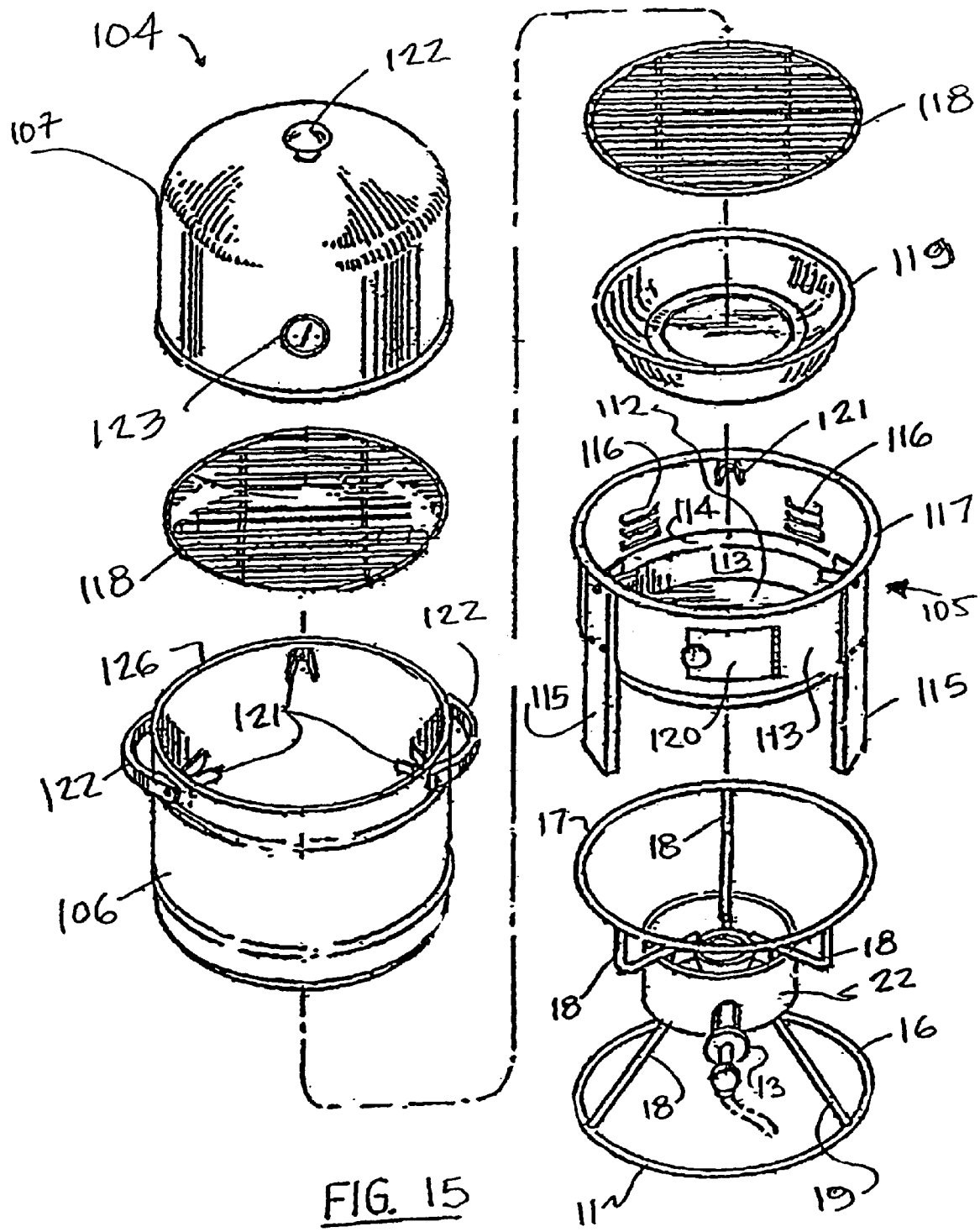
FIG. 15 is an exploded perspective view of a third embodiment of the apparatus of the present invention.
Figure 16:
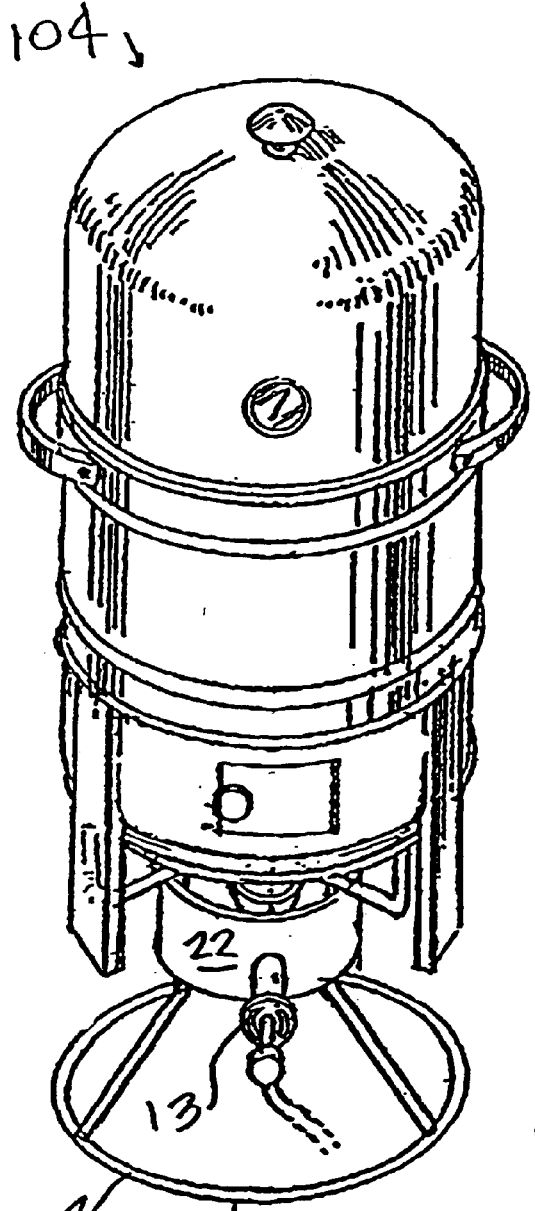
FIG. 16 is a perspective view of the third embodiment of the apparatus of the present invention.

FIGS. 15–20 show a third embodiment of the apparatus of the present invention, designated generally by the numeral 104 in FIGS. 15 and 16. Cooking apparatus 104 is in the form of a combination smoker/burner. This apparatus enables a smoker to be used with the burner that is shown and described with respect to the first and second embodiments of FIGS. 1–14. Smoker apparatus 104 provides a lower section 105, middle section 106, and upper section 107. The upper section 107 basically functions as a cover. The middle section 106 is a cooking chamber. The lower section 105 can be used to contain a bowl that has a liquid that can include seasoning. Alternatively, the sections 105, 106, 107 can be assembled as a free standing smoker separate from burner 11 wherein the bowl 119 can be filled with charcoal.

Figure 19:
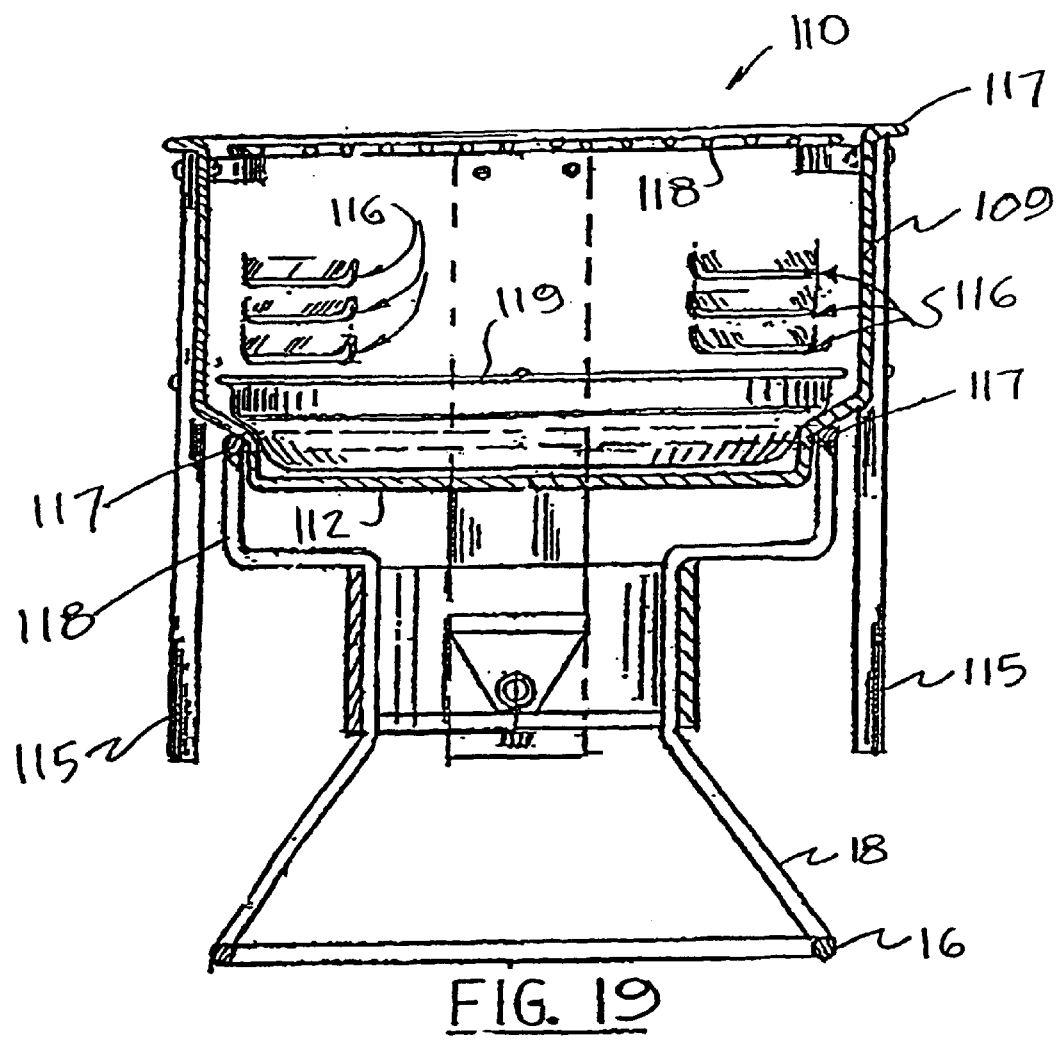
FIG. 19 is a partial sectional elevation view of the third embodiment of the apparatus of the present invention.
Figure 20:
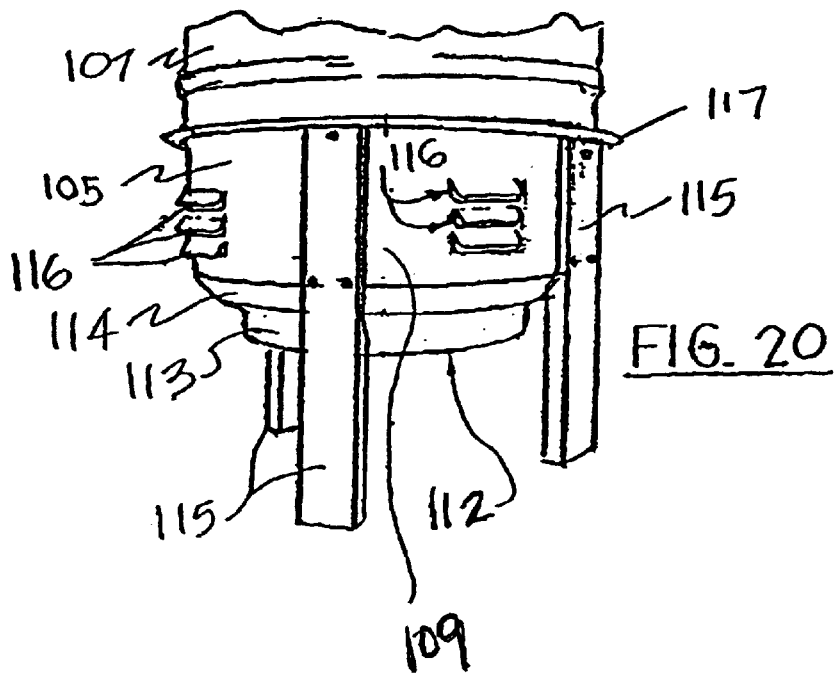
FIG. 20 is a partial perspective view of the third embodiment of the apparatus of the present invention.

Lower section 105 is specially configured to mate with and be supported by burner 11. The lower section 105 provides a larger cylindrical side wall 109 and a smaller cylindrical side wall 113. A tapered annular wall 114 joins the larger cylindrical side wall 109 and the smaller cylindrical side wall 113 as shown in FIG. 19. A bottom panel 112 connects to the lower end of the smaller cylindrical side wall 113. When not in use upon burner 11, the smoker sections 105, 106, 107 can be supported by any means known in the art such as for example, a plurality of legs 115 or a separate base that is not a burner and that fits the contours of bottom 112, small side wall 113, tapered annular side wall 114, and/or larger cylindrical side wall 109.

An access door 120 can be provided in lower section 105 as can be air vent openings 116. The lower section 105 can provide a flat, annular flange 117 or other suitable mating surface for supporting middle section 106.

Similarly, upper section 107 is configured to fit upon the upper edge 126 of middle section 106.

A cooking grate 118 can be supported upon one or more supports 121 provided on the interior of lower section 105. Similarly, a plurality of supports 121 can also be provided at the upper end portion of middle section 106 for supporting a cooking grate. Handles 122 can be provided on any of the sections 105, 106, 107 as desired for manipulating the various sections. The cover can be provided with usual thermometer and burner 11 can provide a jet or nozzle 125 and/or a flame diffuser 124.

It should be understood that the general concept of a smoker that includes multiple sections such as 105, 106, 107 is old in the art, having been sold commercially a number of years such by Brinkman and others.

FIGS. 21–25 show a fourth embodiment of the apparatus of the present invention designated generally by the numeral 130. Cooking apparatus 130 includes a pot 131 having a pot side wall 132 that is generally cylindrically shaped and provided with a pair of handles 133. Pot 131 provides a generally flat, circular bottom 134 and has an interior 153 that can retain items to be cooked, cooking fluid and a perforated basket 135 or liner that enables food items to be inserted into the pot interior 153 and removed therefrom when cooking is completed. The perforated basket enables draining of any cooking fluid while retaining the food items that are to be cooked such as for example, crabs, poultry items, seafood items and the like. The perforated basket 135 can be lifted using bail 136.

Figure 21:
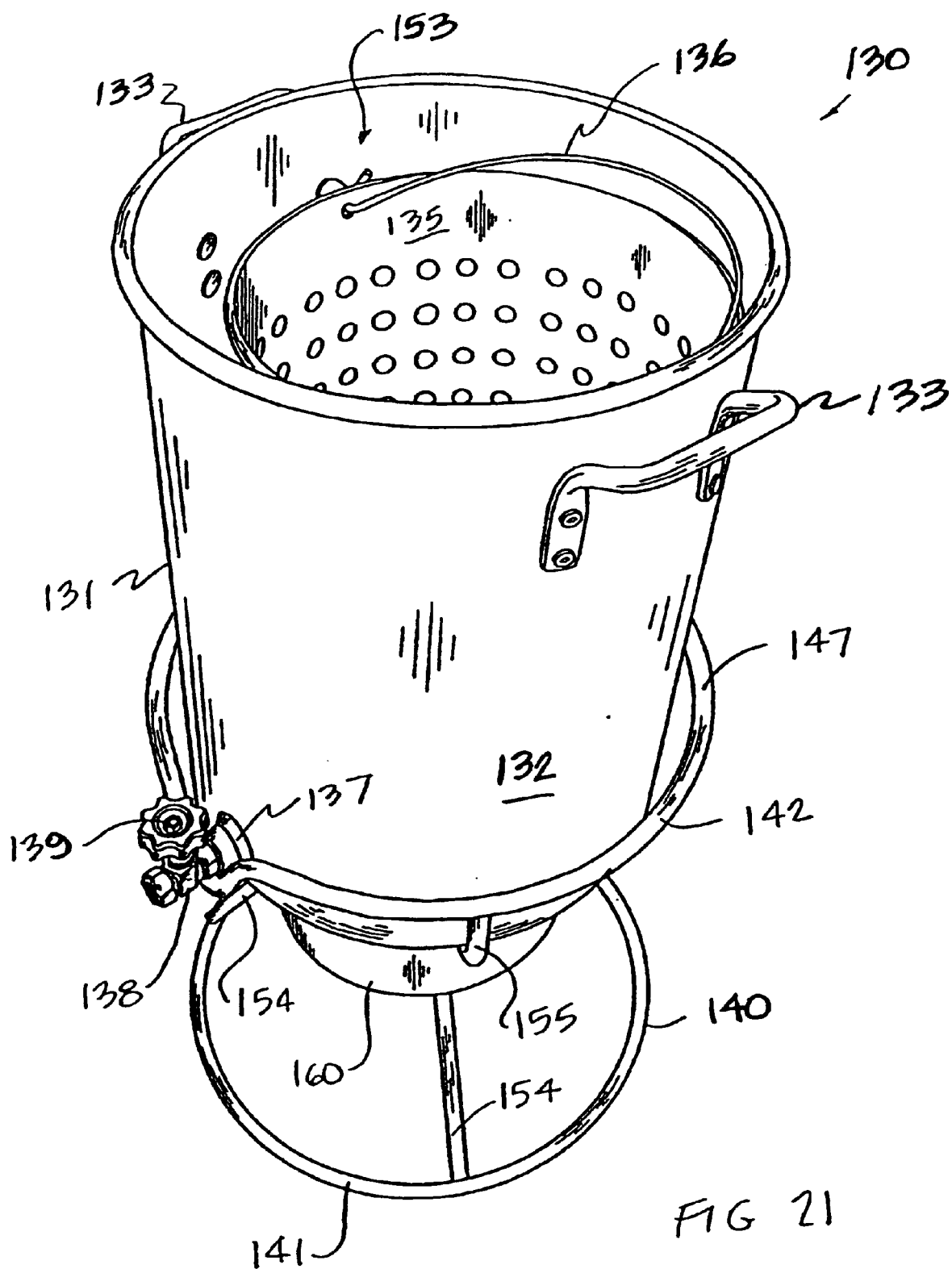
FIG. 21 is a perspective view of a fourth embodiment of the apparatus of the present invention.
Figure 22:
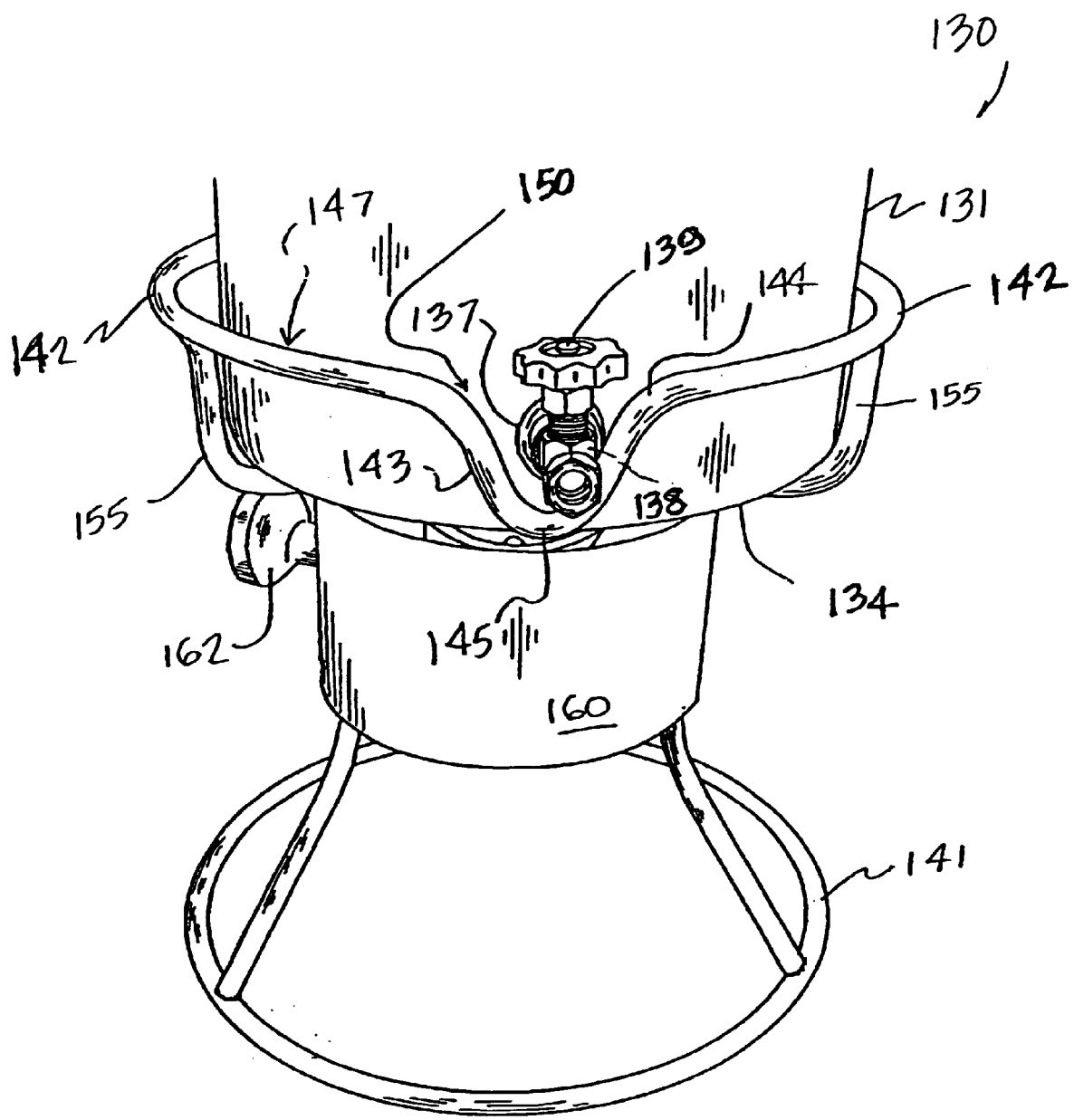
FIG. 22 is a partial perspective view of the fourth embodiment of the apparatus of the present invention.
Figure 23:
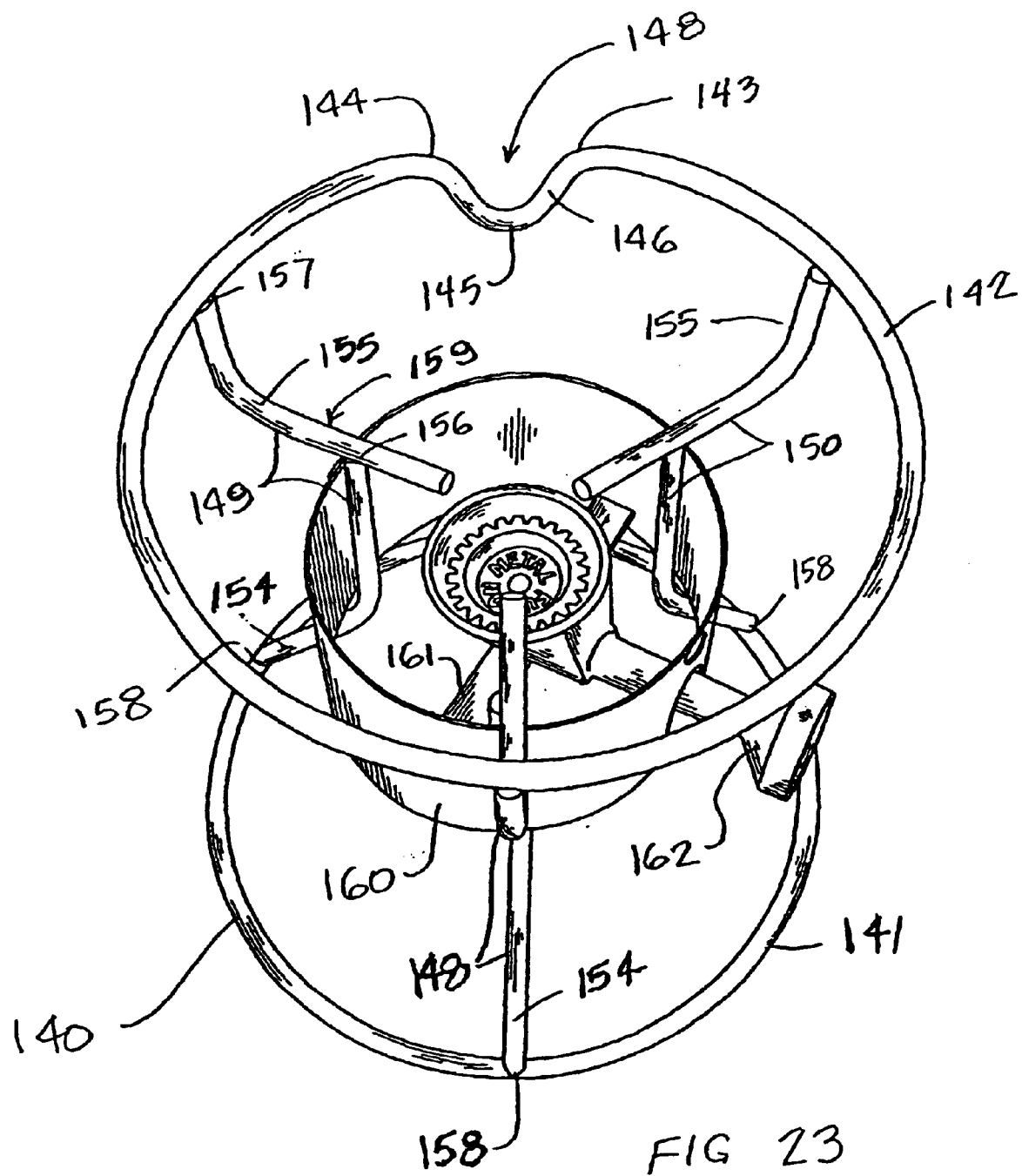
FIG. 23 is a partial perspective view of the fourth embodiment of the apparatus of the present invention illustrating the burner portion thereof.
Figure 24:
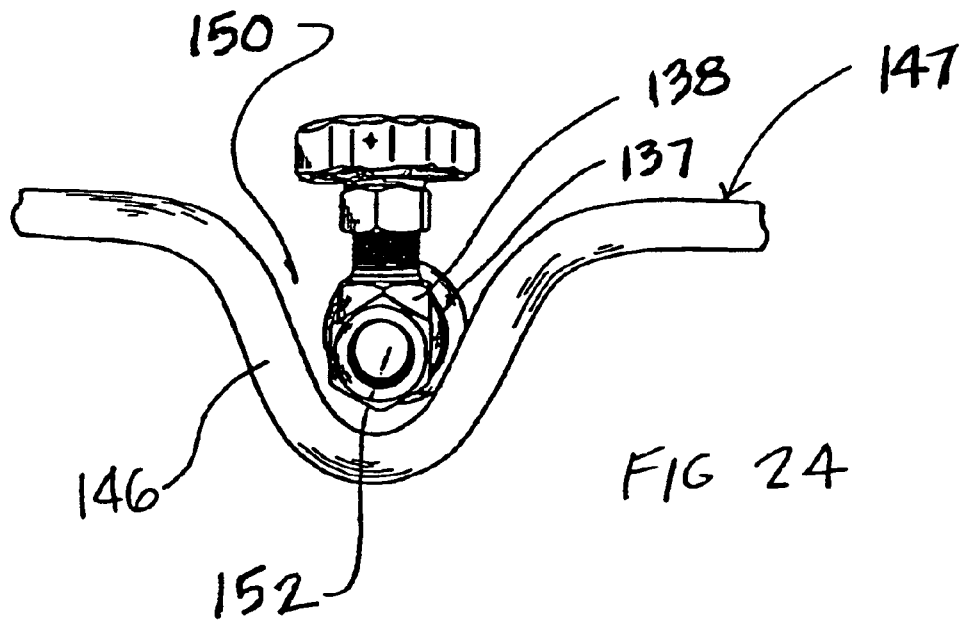
FIG. 24 is a fragmentary view of the fourth embodiment of the apparatus of the present invention illustrating a portion of the burner and a portion of the pot illustrating its valved drain line.
Figure 25:
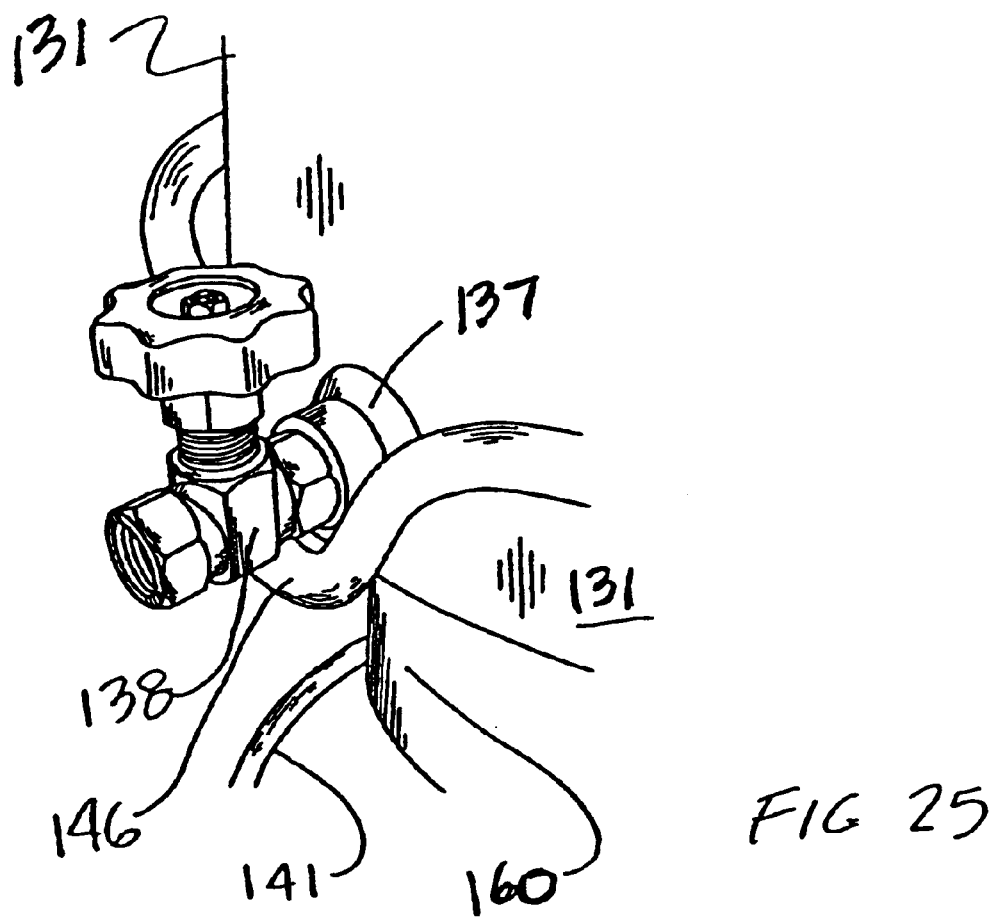
FIG. 25 is a partial perspective view of the fourth embodiment of the apparatus of the present invention.

Drain outlet fitting 137 is provided in pot sidewall 132 and at a lower position that is next to pot bottom 134 as shown in FIGS. 21, 22 and 24–25. The drain outlet fitting 137 has an attached valve 138 that can be opened or closed by rotating valve stem 139. Such an outlet 137 and valve 138 can be welded e.g. to the pot 131 wall 132. This concept of providing a drain outlet fitting 137 with an attached valve 138 is per se known, being disclosed for example in the Durham U.S. Pat. No. 123,876; the Clayton patent U.S. Pat. No. 1,272,222, and the Baker U.S. Pat. No. 2,350,335 each of which is hereby incorporated herein by reference. Burner 140 supports pot 131 during cooking. The burner 140 includes a lower ring 141, an upper ring 142, and a plurality of struts 148, 149, 150 that extend between the upper ring 142 and lower ring 141 as shown in FIGS. 21, 22 and 23. A feature of the present invention is the special burner configuration at upper ring 142 that enables fluid to be drained from pot 131 without removing pot 131 from burner 140.

Upper ring 142 has a U-shaped section 146 defined by bends 143, 144, 145. The U-shaped section 146 thus extends below upper surface 147 of upper ring 142 as shown in FIGS. 21, 22 and 24–25. The U-shaped section 46 provides a recess 151 that enables valve 138 to extend a radial distance beyond the outer periphery of upper ring 142 as shown in FIGS. 21, 22 and 24–25. The combination of drain outlet fitting 137 and valve 138 provide a flow bore 152 during use. The valve 138 can be opened for draining fluid from the pot 131. This can be helpful when cooking with large volumes of cooking fluid such as vegetable oil that is commonly used is the cooking of poultry items such as large turkeys. After the vegetable oil that is used to cook a turkey has cooled, it can be drained easily into its original one gallon container by opening the valve 138 with a rotation of stem 139 in a counterclockwise direction. Peanut oil, for example, is commonly used for frying turkeys and is commonly sold in one gallon containers.

Each of the struts 148, 149, 150 has a plurality of sections. These sections include a lower section 154 and an upper section 155. As shown in FIG. 23, the upper section 155 is generally L-shaped being attached to upper ring 142 at connection 157 (for example, a welded connection). The strut lower section 154 is an elongated, partially inclined and partially vertical member that attaches to upper section 155 at connection 156, a connection that can be welded, for example. The lower section 154 is attached to lower ring 141 at connection 158, preferably a welded connection. The upper sections 155 each provide a generally horizontal upper surface portion 159 that cradles the bottom 134 of pot 131 during use as shown in FIGS. 21 and 22.

A wind guard or shroud 160 can be provided to burner 140 as shown in FIGS. 21 and 22, surrounding these three struts 148, 159 and being attached thereto by welding, for example. Shroud 160 can provide a support bar 161 for supporting a burner element 162. The burner element 162 can be a common, commercially available cast iron burner element that is fueled by a gaseous fuel such as propane or butane.

Figure 26:
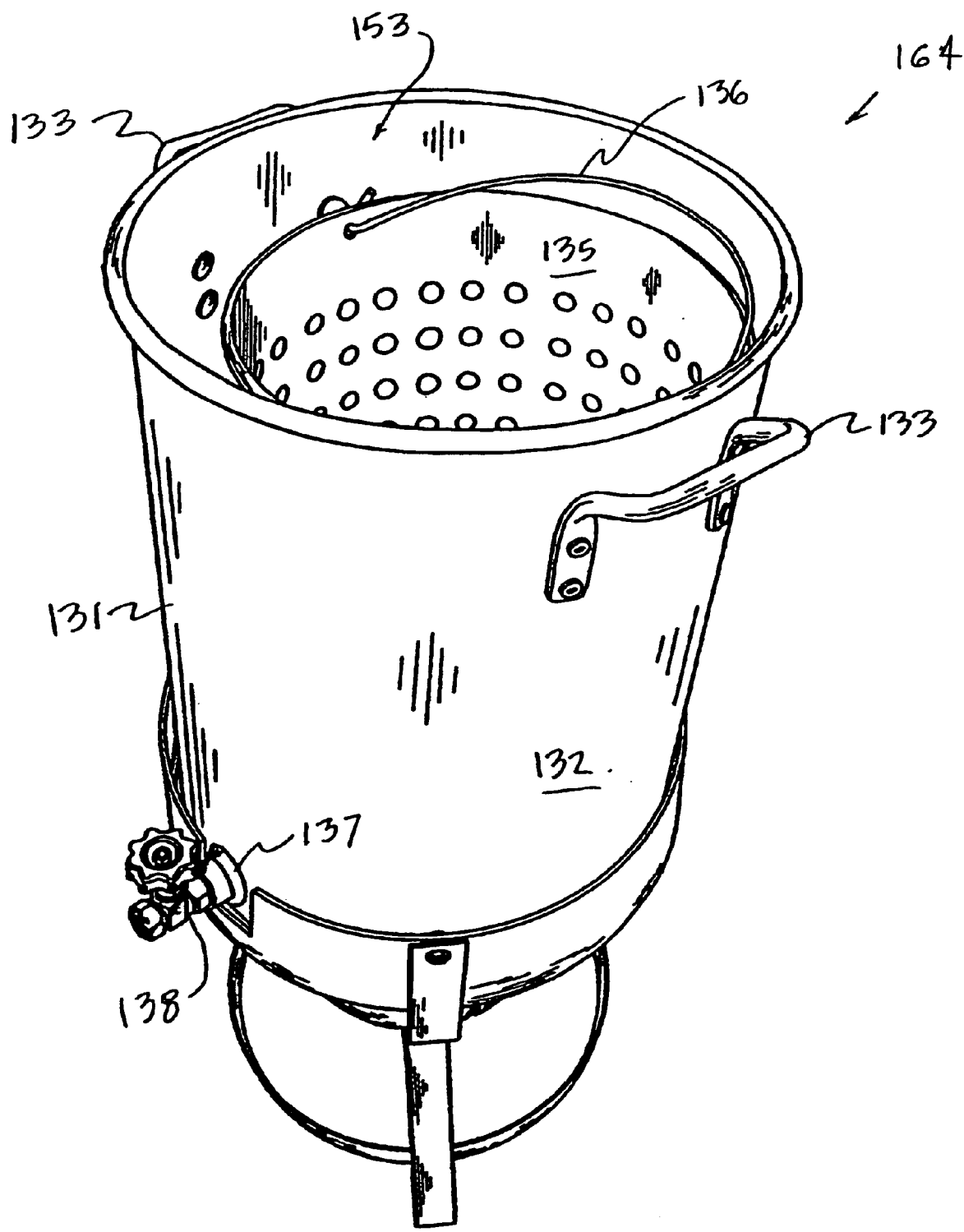
FIG. 26 is a perspective view of a fifth embodiment of the apparatus of the present invention.
Figure 27:
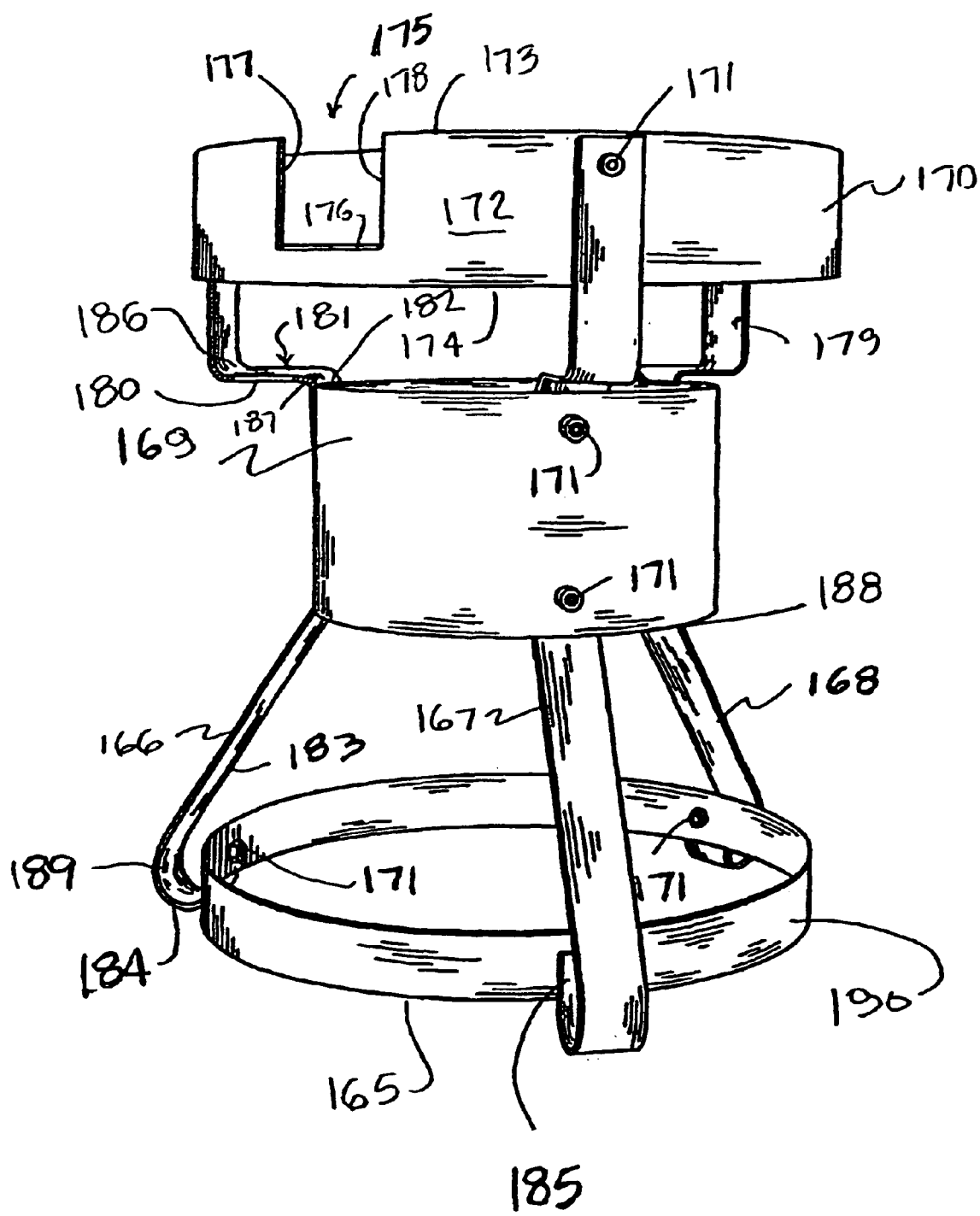
FIG. 27 is a partial perspective view of the fifth embodiment of the apparatus of the present invention illustrating the burner portion thereof.

A fifth embodiment of the apparatus of the present invention is shown in FIGS. 26 and 27, designated generally by the numeral 164. Cooking apparatus 164 includes a burner 165 that is configured to support a pot 131 having a generally cylindrically shaped pot side wall 132 and a generally circular, flat pot bottom 134. In FIGS. 26 and 27, burner 165 has a plurality of struts 166, 167, 168 that are attached to cylindrically shaped shroud 169. The upper end portion of each of the struts 166, 167, 168 support upper ring 170 which is cylindrically shaped, having cylindrical ring wall 172. Bolted connections 171 can be used to attach upper ring 170 to each of the struts 166, 167, 168. The upper ring 170 provides an upper edge 173 and lower edge 174. Recess 175 is cut out of upper ring 170, wall 172. Recess 175 is surrounded by surfaces 176, 177 and 178 as shown in FIG. 27. The recess 175 enables the pot drain outlet fitting 137 and valve 138 to extend radially beyond the circumference of ring 170 as shown in FIG. 26.

Each strut 166 is comprised of a plurality of sections. However, each strut 166 can be an integral structure. In FIGS. 26 and 27, each strut 166, 167, 168 is comprised of a vertical upper section 179 arid horizontal section 180 that cradles the pot 131 during use. Vertical section 179 and horizontal section 180 are connected at bend 186. The horizontal sections 180 each providing a flat upper surface 181 upon which the pot 131 bottom 134 rests during cooking. Vertical section 182 extends between bend 187 and bend 188. Inclined section 183 of each strut 166, 167, 168 extends between bend 188 and curved foot 184. The curved foot 184 connects to inclined section 183 at bend 189. An upturned end portion 185 of each strut 166, 167, 168 can be fastened (for example bolted using bolted connection 171) to lower ring 190.

PARTS LIST

The following is a list of suitable parts and materials for the various elements of the preferred embodiment of the present invention.

| Part Number | Description |
|---|---|
| 10 | cooking apparatus |
| 11 | burner |
| 12 | pot |
| 13 | supply valve |
| 14 | basket |
| 15 | interior |
| 16 | lower ring |
| 17 | upper ring |
| 18 | strut |
| 19 | lower strut section |
| 20 | upper strut section |
| 21 | center strut section |
| 22 | wind guard |
| 23 | lower linear section |
| 24 | upper linear section |
| 25 | bend |
| 26 | bend |
| 27 | bottom surface |
| 28 | pot sidewall |
| 29 | inside diameter |
| 30 | outside diameter |
| 31 | base |
| 32 | intersecting member |
| 33 | intersecting member |
| 34 | vertical member |
| 35 | vertical member |
| 36 | bail |
| 37 | hook |
| 38 | hook |
| 39 | end |
| 40 | end |
| 41 | steamer plate |
| 42 | peripheral edge |
| 43 | central opening |
| 44 | openings |
| 45 | upper surface |
| 46 | support |
| 47 | horizontal post |
| 48 | horizontal post |
| 49 | slot |
| 50 | slot |
| 51 | handle portion |
| 52 | side |
| 53 | side |
| 54 | transverse beam |
| 55 | outdoor cooking apparatus |
| 56 | upper ring |
| 57 | horizontal strut |
| 58 | horizontal strut |
| 59 | horizontal strut |
| 60 | vertical strut |
| 61 | vertical strut |
| 62 | vertical strut |
| 63 | leg |
| 64 | straight section |
| 65 | bend |
| 66 | straight section |
| 67 | leg |
| 68 | straight section |
| 69 | bend |
| 70 | straight section |
| 71 | leg |
| 72 | cylindrical flue |
| 73 | fuel supply line |
| 74 | vertical bore |
| 75 | nozzle |
| 76 | circular plate |
| 77 | weld |
| 78 | flame |
| 79 | arrows |
| 80 | central axis |
| 81 | burner apparatus |
| 82 | frame |
| 83 | beam |
| 84 | beam |
| 85 | beam |
| 86 | beam |

-continued

| Part Number | Description |
|---|---|
| 87 | beam |
| 88 | leg |
| 89 | leg |
| 90 | horizontal member |
| 91 | inclined member |
| 92 | inclined member |
| 93 | attachment |
| 94 | burner |
| 95 | shroud |
| 96 | burner element |
| 97 | ring |
| 98 | grate member |
| 99 | horizontal section |
| 100 | vertical section |
| 101 | bend |
| 102 | attachment |
| 103 | attachment |
| 104 | smoker apparatus |
| 105 | lower section |
| 106 | middle section |
| 107 | upper section |
| 109 | cylindrical sidewall |
| 110 | open top |
| 112 | bottom panel |
| 113 | cylindrical sidewall |
| 114 | tapered annular wall |
| 115 | leg |
| 116 | air vent opening |
| 117 | annular flange |
| 118 | cooking grate |
| 119 | bowl |
| 120 | door |
| 121 | support |
| 122 | handle |
| 123 | thermometer |
| 124 | flame diffuser |
| 125 | nozzle |
| 126 | upper edge |
| 130 | cooking apparatus |
| 131 | pot |
| 132 | pot side wall |
| 133 | handle |
| 134 | bottom |
| 135 | perforated basket |
| 136 | bail |
| 137 | drain outlet fitting |
| 138 | valve |
| 139 | stern |
| 140 | burner |
| 141 | lower ring |
| 142 | upper ring |
| 143 | bend |
| 144 | bend |
| 145 | bend |
| 146 | U-shaped section |
| 147 | upper surface |
| 148 | street |
| 149 | strut |
| 150 | strut |
| 151 | recess |
| 152 | bore |
| 153 | pot interior |
| 154 | lower section |
| 155 | upper section |
| 156 | connection |
| 157 | connection |
| 158 | connection |
| 159 | upper surface |
| 160 | shroud |
| 161 | support bar |
| 162 | burner element |
| 164 | cooking apparatus |
| 165 | burner |
| 166 | strut |
| 167 | strut |
| 168 | strut |
| 169 | shroud |

-continued

| Part Number | Description |
|---|---|
| 170 | upper ring |
| 171 | bolted connection |
| 172 | ring wall |
| 173 | upper edge |
| 174 | lower edge |
| 175 | recess |
| 176 | surface |
| 177 | surface |
| 178 | surface |
| 179 | vertical section |
| 180 | horizontal section |
| 181 | flat surface |
| 182 | vertical section |
| 183 | inclined section |
| 184 | curved foot |
| 185 | upturned end portion |
| 186 | bend |
| 187 | bend |
| 188 | bend |
| 189 | bend |

The foregoing embodiments are presented by way of example only; the scope of the present invention is to be limited only by the following claims:

What is claimed is:

1. A cooking apparatus, comprising:
   a) a burner having a frame that includes a base for engaging an underlying support surface, the frame having a burner element for generating a high intensity flame for use in cooking the burner frame having a support surface for cradling a pot;
   b) a pot that includes a generally flat bottom portion, a generally cylindrically shaped continuous sidewall and a generally cylindrically shaped interior;
   c) a valved drain on the pot sidewall that enables cooking fluid to be drained from the pot;
   d) the frame including a plurality of at least three struts, each strut including a first strut portion, a second strut portion and a third strut portion, the first strut portion of each strut being generally parallel with the bottom portion of the pot, the second strut portion of each strut extending in a generally vertical direction from the second strut portion, the third strut portion extending downwardly from the second strut portion;
   e) at least a portion of each of the first strut portions extending underneath the bottom portion of the pot when the pot is placed on the frame;
   f) the second strut portions restricting a range of lateral pot movement during use of the cooking apparatus such as when a food to be cooked is inserted into or removed from the pot;
   g) an upper ring member attached to the struts at a position that is above the valved drain during use; and
   h) the ring having a generally U-shaped portion that extends along each side of and under the valved drain.

2. The cooking apparatus of claim 1, wherein the ring is attached to the second strut portion for each of the plurality of struts.

3. The cooking apparatus of claim 1 wherein the base is a circular ring portion of the frame.

4. The cooking apparatus of claim 1 wherein there are at least three circumferentially spaced apart radially extending struts that are spaced about 120 degrees apart.

5. The cooking apparatus of claim 1 further comprising a food holder that fits inside the pot interior, the food holder having abase portion that registers against the bottom of the pot and a vertically extending portion that enables a user to lift the food holder.

6. The cooking apparatus of claim 5 further comprising a horizontally extending portion that is connectable to the food holder and that is sufficiently wide that a user can grip the horizontally extended section with his or her hand or hands.

7. The cooking apparatus of claim 1 wherein the ring has a section with bends that define the U-shaped portion.

8. The cooking apparatus of claim 1 wherein the ring has a ring wall and a cutout portion of the wall defines said U-shaped portion.

9. A cooking apparatus, comprising:
a) a burner having a frame that includes a base for engaging an underlying support surface, the frame having a burner element for generating a high intensity flame for use in cooking, the burner frame having a support surface for cradling a pot;
b) a pot that includes a generally flat bottom portion and a generally cylindrically shaped continuous sidewall, the pot having a generally cylindrically shaped interior;
c) a valved drain on the pot sidewall that enables cooking fluid to be drained from the pot;
d) a food holder that fits inside the pot, the food holder having a lower end portion for holding food and an upper end portion that enables a user to grip and lift or lower the food holder;
e) the frame including a plurality of struts, each strut comprising a first strut portion, a second strut portion and a third strut portion, the first strut portion of each strut being generally parallel with the bottom portion of the pot, the second strut portion of each strut generally tracking upwardly along the sidewall of the pot, the third strut portion including an inclined portion and comprising at least in part the base;
f) at least a portion of at least one of the first strut portions extending underneath the bottom portion of the pot when the pot is placed on the frame; and
g) the combination of the second strut portions and upper ring restricting a range of lateral a pot movement during use of the cooking apparatus such as when the food holder is inserted into or removed from the pot;
h) an upper ring member attached to the struts at a position that is above the valved drain during use; and
i) the ring having a generally U-shaped portion that extends along each side of and under the valved drain.

10. The cooking apparatus of claim 9, further comprising a lower ring attached to the third strut portion to define at least in part the base.

11. The cooking apparatus of claim 9 wherein the base is a circular ring portion of the frame.

12. The cooking apparatus of claim 9 wherein there are at least three circumferentially spaced apart struts.

13. The cooking apparatus of claim 9 wherein the upper ring member is generally cylindrically shaped.

14. The cooking apparatus of claim 9 wherein most of the upper ring member extends above the valved drain during use.

15. The cooking apparatus of claim 9 wherein the struts are connected to the upper ring at positions that are spaced away from the U-shaped portion of the upper ring.

16. A cooking apparatus, comprising:
a) a burner having a frame that includes a base for engaging an underlying support surface, the frame having a burner element for generating a high intensity flame for use in cooking; the burner frame having a support surface for cradling a pot;
b) a pot that includes a generally flat bottom portion, a generally cylindrically shaped continuous sidewall, the pot having a generally cylindrically shaped interior and a valved drain flowline;
c) the frame further including a plurality of struts, each strut comprising a first strut portion and a second strut portion, the first strut portion of each strut being generally parallel with the bottom portion of the pot;
d) at least a portion of the first strut portions extending generally horizontally and underneath the bottom portion of the pot when the pot is placed on the frame;
e) each strut further including a second strut portion with an upper end spaced above the bottom of the pot during use;
f) an upper ring member attached to the second strut portions;
g) the ring and second strut portions restricting a range of lateral pot movement during use of the cooking apparatus such as when a liner is inserted or removed from the pot; and
h) a portion of the upper ring extending under and on opposing sides of the valve drain flowline.

17. The cooking apparatus of claim 16, further comprising a lower ring attached to the each of the plurality of struts.

18. The cooking apparatus of claim 17 wherein the frame includes a pair of rings that are connected to the struts at spaced apart positions defining the top and bottom of the frame.

19. The cooking apparatus of claim 16 wherein there are at least three circumferentially spaced apart strut.

20. The cooking apparatus of claim 16 further comprising a food holder that fits inside the pot interior, the food holder having a base that registers against the bottom of the pot and a vertically extending portion that enables a user to lift the food holder.

21. A cooking apparatus, comprising:
a) a burner having a frame that includes a base for engaging an underlying support surface, the frame having a burner element for generating a high intensity flame for use in cooking, the burner frame having a pot support surface above the burner element for cradling a pot;
b) a pot that includes a generally flat bottom portion, a generally cylindrically shaped continuous sidewall and a generally cylindrically shaped interior,
c) a valved drain on the pot sidewall that enables cooking fluid to be drained from the pot;
d) the frame including an upper ring that extends above the pot support surface;
e) at least a portion of the frame extending underneath the bottom portion of the pot when the pot is placed on the frame;
f) the upper ring having portions that restrict a range of lateral pot movement during use of the cooking apparatus, as when a food item to be cooked is inserted into or removed from the pot;
g) at least part of the upper ring member extending above the valved drain during use; and
h) the ring having a recess portion that extends under the valved drain.

22. The cooking apparatus of claim 21, wherein the ring is supported by a plurality of struts.

23. The cooking apparatus of claim 21 wherein the base includes a circular ring portion.

24. The cooking apparatus of claim 22 wherein there are at least three circumferentially spaced apart radially extending struts that are spaced about 120 degrees apart.

25. The cooking apparatus of claim 21 further comprising a food holder that fits inside the pot interior, the food holder having a base portion that registers against the bottom of the pot and a vertically extending portion that enables a user to lift the food holder.

26. The cooking apparatus of claim 25 wherein the recess is defined by a bend in the upper ring.

27. The cooking apparatus of claim 26 wherein the ring is generally cylindrically shaped.

28. The cooking apparatus of claim 27 wherein the ring has a ring wall and a cutout portion of the wall defines said recess.

29. A cooking apparatus, comprising:
   a) a burner having a frame that includes a base for engaging an underlying support surface, the frame having a burner element for generating a high intensity flame for use in cooking, the burner frame having a pot support surface for cradling a pot, the pot being removably supported upon the burner frame pot support surface;
   b) a pot that includes a bottom portion and a generally cylindrically shaped continuous sidewall, the pot having an interior;
   c) a valved drain outlet mounted on the pot sidewall that enables cooking fluid to be drained from the pot;
   d) a food holder inside the pot interior, the having a lower end portion for holding food and an upper end portion that enables a user to grip and lift or lower the food holder,
   e) the frame including a plurality of struts, each strut comprising multiple strut portions and an upper ring;
   f) at least some of the strut portions extending above the pot support surface, restricting a range of lateral pot movement during use;
   g) at least some of the strut portions extending above the valved drain during use; and
   h) the frame providing a recess that extends under the valved drain when the pot rests upon the pot support surface.

30. The cooking apparatus of claim 29, further comprising a lower ring that defines at least in part the base.

31. The cooking apparatus of claim 29 wherein the base is a circular ring portion of the frame.

32. The cooking apparatus of claim 29 wherein the frame includes at least three circumferentially spaced apart strut portions.

33. The cooking apparatus of claim 29 wherein the frame includes an upper ring member supported by the frame, the ring member extending above the pot support surface.

34. The cooking apparatus of claim 33 wherein most of the upper ring member extends above the valved drain during use.

35. The cooking apparatus of claim 29 wherein the strut portions connect to the upper ring at positions that are spaced away from the recess.

36. A cooking apparatus, comprising:
   a) a burner having a frame that includes a base for engaging an underlying support surface, the frame having a burner element for generating a high intensity flame for use in cooking, the burner frame having a support surface for cradling a pot;
   b) a pot that includes a bottom portion, a generally cylindrically shaped continuous sidewall, an interior and a valved drain flowline;
   c) the frame further including a plurality of struts;
   d) the struts supporting an upper ring member;
   e) the upper ring member restricting a range of lateral pot movement during use of the cooking apparatus such as when a liner is inserted or removed from the pot; and
   f) a portion of the upper ring extending under and on opposing sides of the valved drain flowline.

37. The cooking apparatus of claim 36, further comprising a lower ring attached to the each of the plurality of struts.

38. The cooking apparatus of claim 37 wherein the frame includes a pair of rings that are connected to the struts at spaced apart positions.

39. The cooking apparatus of claim 36 wherein there are at least three circumferentially spaced apart struts.

40. The cooking apparatus of claim 36 further comprising a food holder that fits inside the pot interior, the food holder having a base that registers against the bottom of the pot and a vertically extending portion that enables a user to lift the food holder.

* * * * *